Sept. 19, 1961 R. L. FORD 3,000,674
ANTI-FRICTION WAYS FOR MACHINE TOOLS
Filed Dec. 11, 1957 3 Sheets-Sheet 1
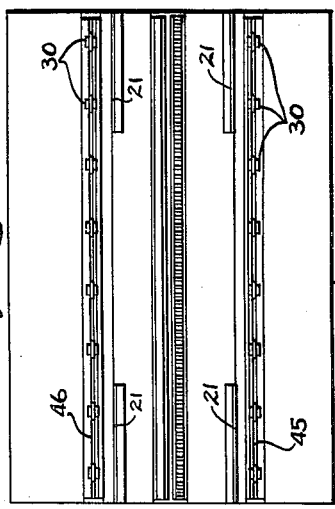
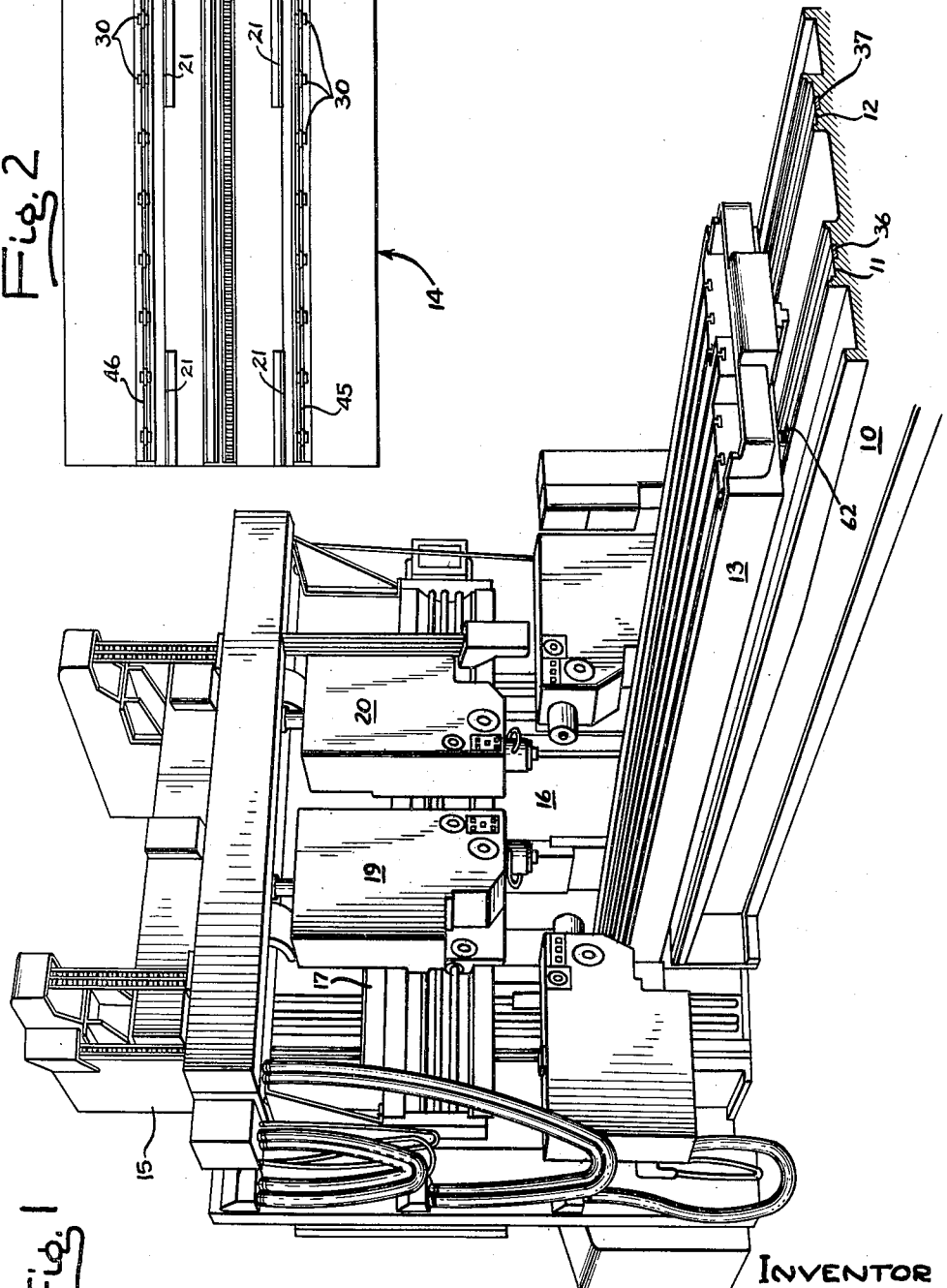
INVENTOR
RALPH L. FORD
by: Carlson, Pitzner, Hubbard & Wolfe
ATTYS.

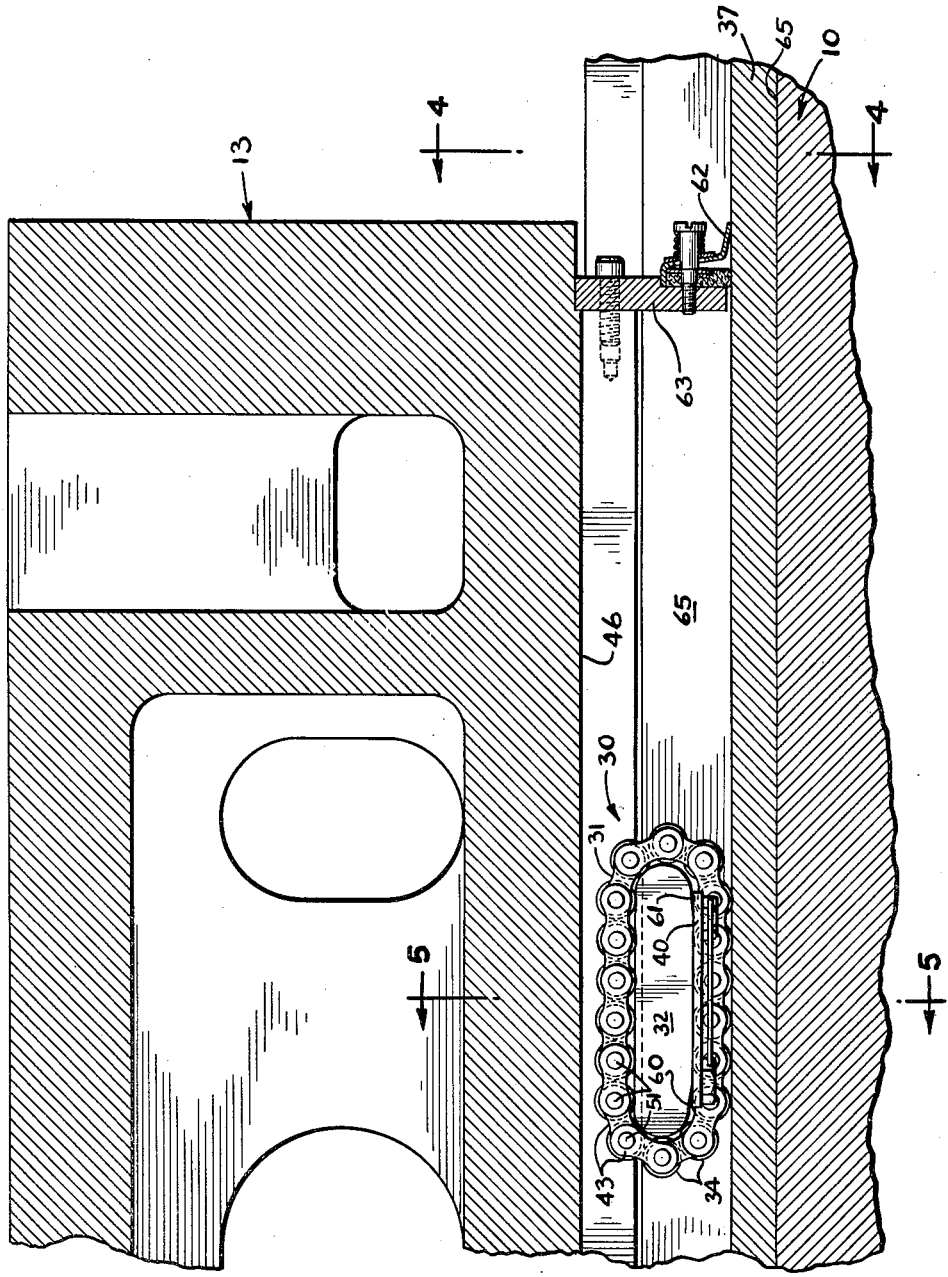

Sept. 19, 1961 R. L. FORD 3,000,674
ANTI-FRICTION WAYS FOR MACHINE TOOLS
Filed Dec. 11, 1957 3 Sheets-Sheet 3
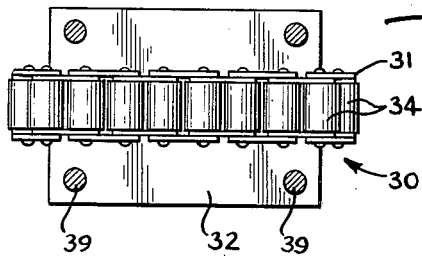
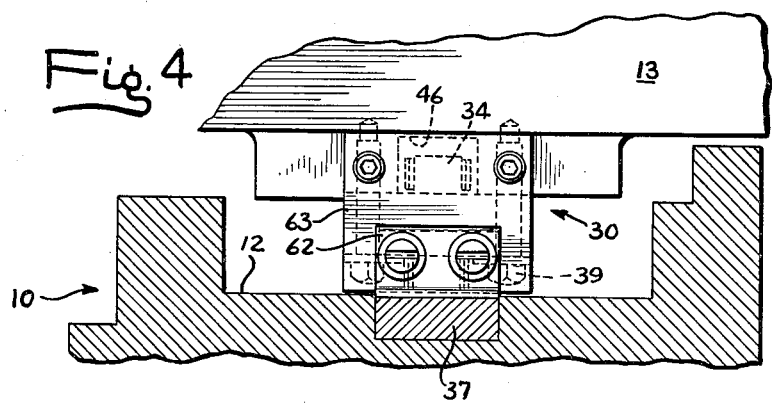
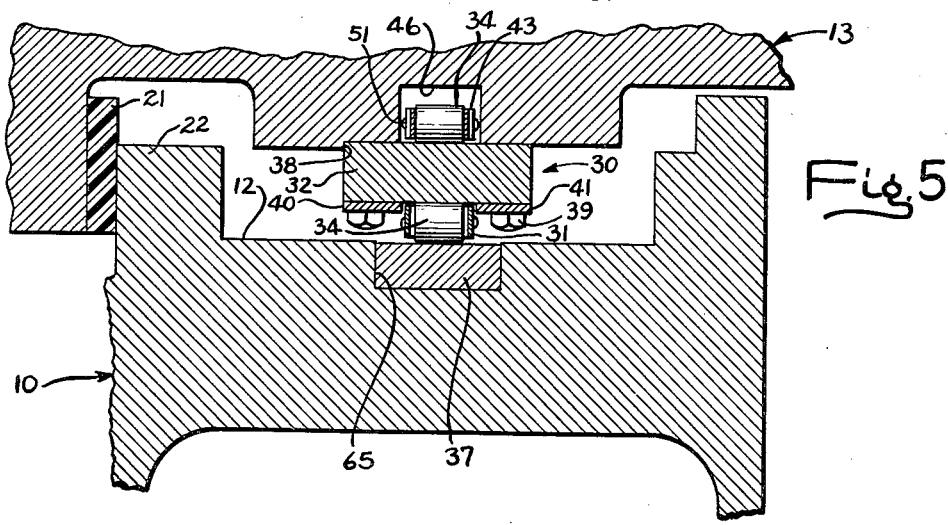
INVENTOR
RALPH L. FORD
by: Carlson, Pitzner, Hubbard & Wolfe
ATTYS.

United States Patent Office 3,000,674
Patented Sept. 19, 1961

3,000,674
ANTI-FRICTION WAYS FOR MACHINE TOOLS
Ralph L. Ford, Fond du Lac, Wis., assignor to Giddings & Lewis Machine Tool Company, Fond du Lac, Wis., a corporation of Wisconsin
Filed Dec. 11, 1957, Ser. No. 702,014
2 Claims. (Cl. 308—6)

This invention relates to machine tools, and more particularly to a new and improved machine tool way construction for mounting a reciprocable table, as in a planer miller.

In the machine tool field, particularly in the case of heavy machine tools, it has been common practice heretofore to utilize plane sliding ways between the bed of the machine and the table. It has also been a practice, in such machine tools, to employ replaceable non-metallic wear plates on the load bearing areas of the ways and which involve hand scraping operations to produce the final way surfaces.

A general object of the present invention is to provide a novel and improved way construction finding particular, but not exclusive, utility in supporting major members of heavy machine tools such as planer millers and which will be conducive to precision operation with minimum power required to drive such members longitudinally of the ways.

Another object is to provide a way construction of the character set forth and which will render the table or other major member susceptible of being driven longitudinally with minimal friction and minimal deflection or "wind-up" in the drive, resulting in more rapid response to control signals.

A further object of the invention is to provide an anti-friction bearing unit for supporting the table of a machine tool on the ways and which is relatively simple in construction and reasonably inexpensive to manufacture. A related object is to provide a bearing unit of this type which, when mounted, leaves the component parts readily accessible for service, repair or replacement.

Still another object of the invention is to provide a precision mounting arrangement for supporting the table or other major member of a heavy machine tool on the ways through the use of a plurality of spaced apart anti-friction bearing units associated with cooperating surfaces finished by conventional machining operations.

A further object is to provide a mounting arrangement for a table or other machine tool member of the type set forth and which will maintain the same in a precise reference plane along the ways regardless of relative longitudinal speed or oil film thickness, and which will preclude skewing of bearing elements as well as shock and vibration attributable to them.

Other objects and advantages will become apparent from the following description taken in connection with the drawings, wherein:

FIGURE 1 is a perspective view of a machine tool, including a table supported on the bed of the machine by means of anti-friction bearing units embodying the present invention;

FIG. 2 is a bottom plan view of a section of the machine tool table showing the spaced anti-friction bearing units;

FIG. 3 is an enlarged, fragmentary sectional view showing the bed, table, and an individual one of the anti-friction bearing units for the table;

FIG. 4 is an enlarged sectional view showing one of the anti-friction bearing units and fragments of the table and bed, and is taken looking in from the end of the bed substantially in the plane of lines 4—4 of FIG. 3;

FIG. 5 is an enlarged sectional view showing one of the anti-friction bearing units, and is taken through the unit substantially in the plane of lines 5—5 of FIG. 3; and FIG. 6 is an enlarged bottom plan view of one of the anti-friction bearing units with the anti-skewing plates removed.

While the invention is susceptible of various modifications and alternative constructions, an illustrative embodiment has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention as expressed in the appended claims.

Upon more specific reference to the drawings it will be perceived that the invention is there exemplified in an illustrative machine tool built in the form of a large, high-speed planer-type milling machine, such, for example, as the one disclosed in the copending application of Jesse Daugherty, Serial No. 532,172, filed September 2, 1955, now Patent No. 2,899,869. While a more complete description of such machine may be had upon reference to said application, it might be noted here that the machine has found particular utility in contour milling non-ferrous alloy slabs for aircraft wing or tail sections.

As shown more particularly in FIGURE 1, the illustrative machine comprises a bed 10 having horizontal ways 11, 12, which slidably support a table 13 made up of a plurality of sections 14 (FIG. 2). The table may be reciprocated longitudinally of the bed and ways as by means of an appropriate variable speed drive (not shown) and is adapted to carry a workpiece (not shown) mounted for bodily movement therewith for processing by the machine. Straddling the bed and located at the central region thereof are spaced apart, upstanding columns 15, 16 spanned by a cross-rail 17 adapted to be traversed vertically along vertical guideways formed on the front faces of the columns. The front face of the cross-rail 17 is provided with means for mounting a plurality of individually driven headstocks 19, 20, for horizontal traverse thereon. The headstocks 19, 20 are adapted for contour milling, being mounted, controlled and equipped with appropriate cutters for this purpose. Each of the headstocks is constructed with a spindle and quill which allows vertical movement of the cutter and, in addition, the headstocks are movable across the cross-rail simultaneously with movement of the table so as to be capable of performing the contour milling operation.

The table 13, supported on the bed 10 for horizontal reciprocatory movement, is in the present instance comprised of a plurality of sections each of which may be as large as 10 feet wide and 15 feet long, for mounting a workpiece to be milled. The sections of the table together may weigh up to 11 tons and support a workpiece constituting additional weight. The load borne by the table, and consequently by the ways slidably supporting the table, does, of course, vary depending upon the particular type of machine operation, the configuration of the workpiece and the relative direction and rate of movement of the table.

Generally, it has been the practice to employ soft wear plates between the table and the bearing surfaces 11, 12. Such wear plates may be fabricated from plastic material, which is cemented to the ways 11, 12 enabling the plastic material to become virtually an integral part of the ways. Such material provide additional wearing ability, and may be solidly supported so that there is no buckling of the bearing material on the way surfaces. The wear plates do, however, require hand scraping to insure full bearing of the table on the bed.

In accordance with the present invention, provision is made for supporting the table 13 on the bed 10 for longitudinal movement along the ways 11, 12, by means of a plurality of spaced apart anti-friction bearing units adapted for operation on conventionally machined surfaces. This arrangement is such that friction, heat and wear are not only reduced drastically compared with that of plane bearing surface mountings but, in addition, the table 13 is supported on the ways with high precision which is not affected by oil film thickness or table speed. It will be noted at this point that the foregoing arrangement carries the weight of the table and any workpiece mounted thereon. In some instances, it might be desirable to use a somewhat similar anti-friction mounting arrangement for guiding the table laterally as it moves along the ways. In the present machine, however, it has been found practicable to handle the relatively moderate lateral guiding loads by the use of non-metallic wear plates 21 on the table and which coact with fixed guides 22 on the bed.

Referring more particularly to the foregoing anti-friction mounting arrangement, it will be noted that anti-friction bearing units 30 are mounted at spaced locations on the underside of the table 13 (FIG. 2) so as to rest on the way surfaces 11, 12 of the bed. Each of the roller bearing units 30 comprises a procession of closely spaced rollers adapted to circulate in a carefully guided path. In the present instance, each such unit 30 is comprised of roller chains 31 trained around support blocks 32 which are fixed to the table 13. The latter is adapted to roll on the rollers positioned under the block longitudinally along the way surface, thus providing anti-friction bearing means for supporting an apportioned amount of the total weight imposed by the table and workpiece.

As illustrated in FIGS. 2 and 3, the support blocks 32 are in this case secured to the underside of the table 13 by machine screws and present a rigid, inflexible support or guide for the rollers 34. Here, the blocks 32 are spaced longitudinally and arranged in rows accurately alined over strips 36, 37 of hardened material providing the load bearing surfaces of the ways 11, 12. For obtaining longitudinal alinement of the individual bearing units 30, the underside of the table 13 is grooved providing a shoulder 38 (FIG. 5) against which one side of the support blocks 32 is set when mounting the same to the table. In its location, the individual support blocks may, as already indicated, be secured by means of screws 39 threaded into tapped bores within the table casting. The support blocks 32 have a hard outer surface around which the roller chain 31 circulates and, preferably, are hardened all the way through.

For preventing the roller chain from skewing as it travels on the under surface of the block, chain plates 40, 41 are positioned in closely straddling relation with the lower courses of chain and extend substantially the entire length of the block. These plates 40, 41, similar in size and shape, are replaceable and are positioned with clearance from the side links 43 of the lower course of chain so that the chain 31 ordinarily runs free without touching the edges of the plates. While the plates 40, 41 are provided for purposes of guiding the chain on the underside of the block, the chain is left free to travel in the return course over the block. To provide clearance for the chains 31 over the blocks 32, grooves 45, 46 are machined in the under surface of the table 13, over which the blocks are secured. These grooves 45, 46 are of the same width and are precisely in alinement with the shoulder 38 used for setting the lateral position of the blocks 32.

Each of the roller chains 31 is comprised of rollers 34 rotatably mounted on pins 51 which connect successive side links 43 of the chain. The connecting side links 43 are somewhat narrower than the diameter of the rollers 34 so as to clear the way surface when the chain is traveling on the underside of the hardened block 32. In the present instance, the hardened block 32 is of such a length with relation to the rollers 34 as to be supported by 5 rollers, and the roller chain is sufficiently flexible as to allow relatively free movement of the chain around the block as the table 13 moves along the ways 11, 12. Thus, with this relatively shorter roller chain, the rollers in load bearing relation under the block exchange places with the non-loaded rollers a number of times for each forward traverse of the table 13 under the cross-rail 17, resulting due to this and other factors, in reduced and evenly distributed wear on the individual rollers of the chain.

For the purpose of reducing objectionable shock and vibration as the rollers 34 pass around the end of the block 32, both at the forward edge and at the trailing edge of the block, the lower surface of the block is tapered or inclined 60, 61 (FIG. 3) with relation to the horizontal so that the load is transferred gradually to and from the individual rollers in both directions of table movement. Here a relatively short longitudinal extent at each end of the under surface of the block 32 is tapered at an angle of substantially 18'. It has been found that by this means, where each roller rolls along the flat planar surface, the noise and vibration produced by the shock of the rollers coming off the curved portions of the block and leaving the loaded portion of the block, have been reduced to an extent where they are no longer objectionable.

To clear chips from the way surfaces 11, 12 in front of the rollers, a wiper 62 is mounted at the end of each groove 45, 46 for movement with the table 13. As shown in FIGS. 1 and 3, the wiper 62 is flexibly mounted on a plate 63 which is mounted rigidly to the underside of the table.

The way surfaces 11, 12 on the bed 10, as hereinbefore described, are provided with hardened strips 36, 37, on which the roller bearing units 30 travel. For receiving the strips 36, 37, each way surface is provided with a longitudinal groove 65 (FIG. 5) which is slightly deeper than the strips and extends the full length of the bed. The hardened strip is secured in the groove by peening the top edges at spaced intervals along the length thereof. By reason of the permanent solid support offered by the bed to these strips 36, 37, the upper or load bearing surfaces of these strips may be machined in a single set-up to a precise final dimension making unnecessary any hand-finishing of this surface prior to use.

It will be noted that with accurately machined surfaces on the ways 11, 12 and inserts 36, 37, and with accurately machined surfaces on the underside of the table 13, the thickness of the support blocks and the diameter of the rollers will provide the requisite precision in the vertical positioning of the table. This is assured by making all of the support blocks 32 of the same thickness and, of course, utilizing rollers of uniform size.

In a machine such as the one illustrated herein, satisfactory results have been obtained with a 15 foot table section, by supporting it on bearing units spaced 2 feet on centers, with a total of 8 units in each row resting on the surface of the hardened strips 36, 37, found on the parallel ways 11, 12 of the bed. Thus for a section of a table for a planer miller, the size of which is 10' x 15', a total of 16,000 lbs. is supported, and the load on each roller is approximately 200 pounds. This is well within the capabilities of conventional, precision made roller bearings. With the hardened bearing blocks 32 placing loads of this order of magnitude on such an arrangement of roller bearings, due to the rigidity of the support blocks 32, deflection of the table is negligible. It is noted that while a preferred method has been disclosed of distributing the load attributable to the workpiece and the table, the specific arrangement is exemplary and may be varied depending upon the configuration and total weight of the workpiece, the type of machining operation to be performed, and other factors.

In way constructions wherein soft wear plates are used, uneven wear resulting from causes which cannot be readily avoided, produces unevenly distributed bearing load and areas of high bearing pressure and density. This detracts from the sliding efficiency of the ways and accelerates wear on the wear plates. In the present arrangement, the individual bearing units support a predetermined apportioned amount of the load well within the capabilities of the components of these units, thus having the result of allowing an initially accurate relative positioning of the table relative to the ways, and a longer period of useful life during which this precision may be maintained. This has a direct effect upon the precision with which the workpiece can be machined. Due to the reduction in friction, the wear on both the table and bed way areas is reduced, having the result of longer life as compared with plane way structures. Furthermore, as compared with such plane way structures, the present arrangement offers an advantage in that with roller bearings the "stick-slip" phenomena characteristic of plane sliding ways operating at low speed under heavy loads is eliminated. Moreover, as another factor affecting precision in vertical positioning of the table and, consequently, in machining, the rollers retain positive contact with the ways, whereas a sliding way is affected by the oil film between the two ways which varies with table speed.

I claim as my invention:

1. In a machine tool, the combination comprising, a bed, a reciprocating table, flat parallel horizontal ways on said bed for the reception of said table, a plurality of longitudinally spaced anti-friction bearing units mounted beneath said table over each of said ways for sliding in load bearing relation on the ways, each of said units comprising a block fixed to the table, said block having leading and trailing curved end surfaces, said block also having a straight flat roller contacting load bearing under surface between said curved end surfaces facing the associated way, cylindrical rollers trained in an endless procession around said block which forms a guide therefor, said rollers being trained to travel around the block upon movement of the table along the ways, and means on said block defining a planar guide surface for the rollers extending between one of said curved end surfaces and said flat under surface and inclined at an angle to the latter of substantially 18' so that the load on an individual roller is gradually changed as the latter rolls along said planar surface between said one end surface and the load bearing under surface as the rollers travel around the block.

2. In a machine tool, the combination comprising, a bed, a reciprocating table, flat parallel horizontal ways on said bed for the reception of said table, a plurality of longitudinally spaced anti-friction bearing units mounted beneath said table over each of said ways for sliding in load bearing relation on the ways, each of said units comprising a block fixed to the table, said block having leading and trailing curved end surfaces, said block also having a straight flat roller contacting load bearing under surface between said curved end surfaces facing the associated way, cylindrical rollers trained in an endless procession around said block which forms a guide therefor, said rollers being trained to travel around the block upon movement of the table along the ways, means defining clearance above said block for travel of said rollers around the block with the rollers above the block non-load bearing upon movement of the table along the ways, and means on said block defining a planar guide surface for the rollers extending between one of said curved end surfaces and said flat under surface and inclined at an angle to the latter of substantially 18' so that the load on an individual roller is gradually changed as the latter rolls along said planar surface between said one end surface and the load bearing under surface as the rollers travel around the block.

References Cited in the file of this patent

UNITED STATES PATENTS

| 1,750,140 | Thompson | Mar. 11, 1930 |
| 1,881,675 | Klausmeyer | Oct. 11, 1932 |
| 2,230,442 | Arms | Feb. 4, 1941 |
| 2,559,292 | Ferger | July 3, 1951 |
| 2,599,969 | Bajulaz | June 10, 1952 |
| 2,672,379 | McVey | Mar. 16, 1954 |
| 2,708,285 | Greenspon | May 17, 1955 |
| 2,752,057 | Rush | June 26, 1956 |

FOREIGN PATENTS

| 556,746 | Great Britain | Oct. 20, 1943 |